United States Patent Office 2,967,868
Patented Jan. 10, 1961

2,967,868
CERTAIN SULFUR TRIOXIDE TREATED
IMIDAZOLINE DERIVATIVES

Alvin Howard Smith, Glendale, Mo., assignor to Petrolite Corporation, Wilmington, Del., a corporation of Delaware No Drawing. Filed May 15, 1959, Ser. No. 813,348
6 Claims. (Cl. 260—309.6)

This application is a continuation-in-part of my copending application Serial No. 526,327, filed August 3, 1955, now abondoned.

The present invention is concerned with reaction products obtained by reacting cyclic amidines and certain cyclic amidine derivatives with a sulfonating agent which introduces organically combined sulfur as differentiated from the salt form. The sulfonating agent is sulfur trioxide and the cyclic amidines which may be employed are characterized obviously by being reactive towards sulfur trioxide. Such reactivity may depend on the presence of one of more functional groups. For instance, the presence of a primary or secondary amino group; the presence of a hydroxyalkyl radical; the presence of an unsaturated fatty acid radical, or the residual radical derived therefrom; or in some instances possibly a hydrogen atom attached to carbon is susceptible to reaction.

It is my preference to employ cyclic amidines and cyclic amidine derivatives having at least one primary or secondary amino radical. Under such circumstances I believe that regardless of what else may be formed there is formed a product which may be considered as a substituted sulfamic acid.

For instance, if one prepares a conventional imidazoline from diethylene trimaine and a higher fatty acid and particularly a saturated higher fatty acid and then reacts the imidazoline so obtained with sulfur trioxide, the subsequent result may be a series of reactions but there seems to be evidence that the initial reaction yields a sulfamic acid, $HSO_3NHR$. The substituted sulfamic acid so formed probably can be depicted better as a salt form showing both a positive charge and a negative charge. Briefly, one might speculate that the step involved is as follows:

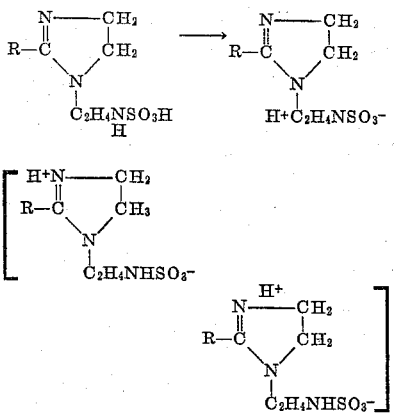

In conducting such reaction involving sulfur trioxide and cyclic amidines, or cyclic amidine derivatives herein described, the reaction is conducted at a temperature below pyrolysis and in such a manner that the resultant product or cogeneric mixture resulting from reaction is solvent soluble. Stated another way, the products so obtained or their salts must be solvent-soluble and particularly in an organic solvent. The present invention is not concerned with solvent-insoluble products or the like which may be obtained by some peculiar sulfonation procedure involving sulfur trioxide.

In any event, having obtained a single reactant or a cogeneric mixture of the kind previously described, said products must be solvent-soluble, either in water, or in an organic solvent which may be a hydrocarbon solvent, or an oxygenated solvent, or a mixture of such solvents. This applies to the product as such or the salt form as, for example, after total or partial neutralization with acetic acid, glycolic acid, lactic acid, gluconic acid, or the like. Thus, such products and the salts may be dissolved in benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. One may use solvents having a common solvent effect, such as the methyl, ethyl, propyl and butyl ethers of various glycols, diglycols and triglycols, such as the ethers corresponding to ethyleneglycol, diethyleneglycol, triethyleneglycol, propyleneglycol, dipropyleneglycol, tripropyleneglycol, butyleneglycol, dibutyleneglycol, tripropyleneglycol, etc. Moreover, as previously pointed out one can use mixtures of one or more of these solvents but in any event the product as such, or in the salt form as noted, must be organic solvent-soluble.

Briefly then, the present invention is concerned with a sulfur trioxide-reated member of the class consisting of cyclic amidines and cyclic amidine derivatives. Said amidines and cyclic amidine derivatives being derived exclusively from polyamines and monocarboxy acids having not over 22 carbon atoms, and dicarboxy acids, some of which may have 36 carbon atoms or more.

For purpose of convenience, what is said hereinafter is divided into eight parts:

Part 1 is concerned with a general description of cyclic amidines and cyclic amidine derivatives of the kind herein employed for reaction with sulfur trioxide;

Part 2 is concerned with suitable polyamines which may be employed to produce the cyclic amidines and cyclic amidine derivatives;

Part 3 is concerned with suitable monocarboxy acids which may be employed in producing the cylcic amidines;

Part 4 is concerned with suitable discarboxy acids which may be employed in the production of cyclic amidines and cyclic amidine derivatives;

Part 5 is concerned with a typical number of cyclic amidines and cyclic amidine derivatives which may be subjected to reaction with sulfur trioxide;

Part 6 is concerned with the reaction between cyclic amidines and sulfur trioxide in order to introduce combined sulfur in organic form as differentiated from salt formation;

Part 7 is cencerned with combinations of the products described in Part 6, preceding, with either low molal acids or high molal acids as, for example, higher fatty acids, or detergent-forming acids so as to form salts; and Part 8 is concerned with uses for the products described in Parts 6 and 7, preceding.

PART 1

Cyclic amidines can be prepared from monocarboxy acids, dicarboxy acids, or their esters. Similarly, some other obvious equivalents could be used such as the amide. This is perfectly obvious because, ignoring the first step of salt formation, when the acid is used a second step is amidification. The third step is ring formation.

The reaction between a glyceride and a polyamine is somewhat different than an acid in certain respects. In the first place salt formation does not take place. If a fatty acid is added to an amine the first step is salt formation. Such step presumably does not appear when a glyceride is used and amidification results in the formation of glycerol or the equivalent alcohol. During subsequent reaction (ring formation) it is possible that the glycerol was decomposed into an aldehyde and the aldehyde in turn may or may not react with one or more reactants having a primary or secondary amine group.

The reaction between carboxy acids and particularly higher fatty acids or their equivalents with suitable polyamines yield cyclic amidines which include tetrahydro pyrimidines and imidazolines. Typical imidazolines are illustrated by the following:

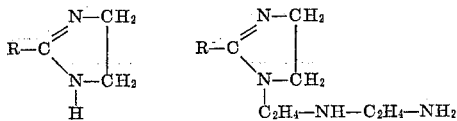

Typical tetrahydo pyrimidines are the following:

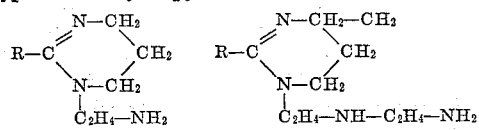

Similarly, cyclic amidines may be derived from a single polyalkylene amine and two molecules capable of furnishing the group R. This is illustrated by the following formula:

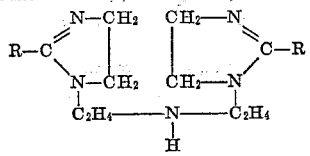

Cyclic amidines also may contain a basic tertiary amino group as illustrated by the following:

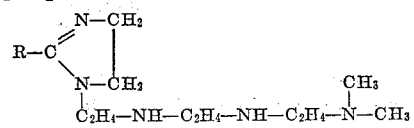

The preparation of imidazolines substituted in the 2-position (the position occupied by R in the above structural formulas) by aliphatic hydrocarbon radicals is described in the literature. It is readily carried out by reacting a monocarboxylic aliphatic acid or its ester or amide with a polyamine, said amine containing at least one primary amino group plus at least one secondary amino group or a second primary amino group, separated from said first primary amino group by 2 carbon atoms.

For details of preparation of imidazolines substituted in the 2-position and made from amines of this type see the following U.S. patents: U.S. Patent No. 1,999,989, dated April 30, 1935, to Bockmuhl et al.; U.S. Patents Nos. 2,155,877 and -8, dated April 25, 1939, to Waldmann et al.

This reaction is generally carried out by heating the reactants at a temperature of 230° C. or higher, usually within the range of 250–300° C., at which temperatures water is evolved and ring closure is effected. For details of the preparation of tetrahydropyrimidines, see German Patent No. 700,371, dated December 18, 1940, to Waldmann et al.; German Patent No. 701,322, dated January 14, 1941, to Miescher et al.; and U.S. Patent No. 2,194,419, dated March 19, 1940, to Chwala.

Reference is made also to aforementioned U.S. Patent No. Re. 23,227, to Blair et al., reissued May 9, 1950; and U.S. Patent No. 2,589,198, to Monson, dated April 11, 1952, for other examples of cyclic amidine materials of the present class. For certain of the 6-membered ring compounds, herein termed tetrahydropyrimidine compounds, see U.S. Patent No. 2,534,826, to Mitchell et al., dated December 19, 1950.

Over and above what appears in the patent literature, reference is made to "Imidazole and Its Derivatives, Part I" Hofmann, Interscience Publishers, Inc., New York, 1953. See also Chemical Reviews, volume 54, pages 593, 613 (1954).

The manufacture of cyclic amidines depends essentially on the use of a temperature above the point of amidification and below the point of pyrolysis. The temperature involved in ring formation, of course, depends in part whether or not vacuum is employed to remove volatile material or perhaps whether or not a dried inert gas, such as nitrogen, is passed through during the reaction period. There is also a variation depending on whether or not one is attempting to make an amino imidazoline, an amido imidazoline, a diamido imidazoline, or the like. What is said in regard to the 5-membered ring compounds applies also to the 6-membered ring compounds although such derivatives are of lesser importance for reasons of economy, as previously noted.

Although cyclic amidines and cyclic amidine derivatives can be prepared in acceptable technical purity in many instances it is advantageous to conduct a reaction so that one obtains a cogeneric mixture of cyclic amidine and cyclic amidine derivatives rather than attempt to obtain a single amidine or single amidine type. Such mixed compositions are just as suitable for the herein described purpose as a single type of reactant in the absence of others. Although the specific types are described in detail substantially the following examples illustrate well known procedures in which cogeneric mixtures are obtained and which can be employed without any effort towards separation. In such cogeneric mixtures one can obviously use a combination of more than one polyamine or if desired a combination of more than one acid equivalent, as for example a mixture of triethylene tetramine and tetraethylene pentamine in combination with a mixture of equal parts of soybean oil and castor oil.

*Example 1aa*

The cyclic amidine was prepared in a conventional stainless steel reactor. The reactor was equipped with an agitator, raw material inlet, reflux and take-off condenser, thermometer, and bottom outlet. To the reactor was added 60 pounds of acetic acid. With agitator turned on, 125 pounds of a 50–50 mixture of diethylene triamine and triethylene tetramine were added. The batch warmed up spontaneously and was further reacted by means of built in electrical reactors. When the temperature reached 290° C. the batch was held at this temperature for 1½ hours, and then allowed to cool back for sampling and storage. During the reacting cycle, 36 pounds of water was removed, together with traces of organic amines. The product was a medium viscous, light colored oil.

*Example 2aa*

In a reactor identical to the one described in Example 1aa, 150 pounds of Emery dimeric acid were warmed up to about 60° C. to facilitate agitation, 42 pounds of a 50–50 mixture of triethylene tetramine and tetraethylene pentamine were then run in over a 10 minute period. The batch was held at 290° C. for 1 hour 45 minutes. 9.5 pounds of water was collected; and the cooled product was found to be a dark amber, viscous oil.

*Example 3aa*

As this example, 150 pounds of castor oil were used, together with a 50–50 mixture of triethylene tetramine and tetraethylene pentamine. The amount of amine used was 84 pounds. About 9.5 pounds of water was taken off together with small amounts of organic oils and amines. The total reaction time was 3½ hours, the last 1½ hour being at 295° C. The product was a dark viscous mass.

*Example 4aa*

Conditions were the same as in Example 3aa, except that a small stream of nitrogen was employed to help remove water. 152 pounds of soyabean oil was charged, together with 26 pounds of diethylene triamine and 48 pounds of tetraethylene pentamine. The product was a medium dark, viscous mass. 10 pounds of aqueous distillate was obtained.

*Example 5aa*

162 pounds of Bogal, crude, were mixed with the same amounts of amines used in Example 4aa. Conditions were also identical. 17 pounds of aqueous distillate was obtained.

*Example 6aa*

A mixture consisting of 76 pounds of soyabean oil and 75 pounds castor oil was reacted with 73 pounds of triethylene tetramine. Conditions were set as in Example 3aa, and 9 pounds of water was collected. The product was similar to that of Examples 3aa and 4aa.

*Example 7aa*

As in Example 3aa, 150 pounds castor oil was treated with 48 pounds of tetraethylene pentamine. In this case, the castor oil represents two mols of fatty acid to one mol of amine. After 2 hours at 300° C., 8 pounds of aqueous distillate had been collected. The cooled product was a semi-solid dark mass.

*Example 8aa*

76 pounds of soyabean oil and 75 pounds of castor oil were charged, together with 37 pounds of triethylene tetramine and 48 pounds of tetraethylene pentamine. This mixture was held at 295° C. for 2 hours and then cooled. 9.5 pounds of aqueous distillate was evolved. The product was similar to others described in this series of examples.

PART 2

Examples of polyamine which may be suitably employed as reactants to produce the nitrogen-containing compounds of the present invention include the polyalkylene polyamines, such as ethylenediamine, diethylenetriamine, triethylenetetramine, tetraethylenepentamine, and higher polyethylene polyamines. They also include 1,2-diaminopropane, N-ethylethylenediamine, N,N-dibutyldiethylenetriamine, 1,2-diaminobutane, hydroxyethylethylenediamine, 1,3-propylenetriamine, and the like.

Equally suitable for use in preparing those compounds of my invention which are tetrahydropyrimidines substituted in the 2-position are the polyamines containing at least one primary amino group and at least one secondary amino group or a second primary amino group, separated from said first primary amino group by 3 carbon atoms.

Examples of amines suitable for this synthesis include 1,3-propylenediamine, 1,3-diaminobutane, 2,4-diaminopentane, N-aminoethyltrimethylenediamine, tripropylenetetramine, tetrapropylenepentamine, high-boiling polyamines prepared by the condensation of 1,3-propylene dichloride with ammonia, and similar polyamines in which there occurs at least one primary amino group separated from another primary or secondary amino group by carbon atoms.

Other than the usually available ethylene polyamines and the derivatives thereof obtained by treating one mole of amine with one mole of an alkylene oxide, such as ethylene oxide, propylene oxide, butylene oxide, glycide, styrene oxide, etc., there are available commercial compounds such as 1,2-diaminopropane, 1,3-diaminobutane, and 3,3'-iminobispropylamine. Such compounds, of course, also can be reacted with a mole of the alkylene oxides previously noted.

Various polyamines of somewhat different structure can be obtained by reacting monoamines or polyamines with alkylene imine, such as ethylene imine, propylene imine, etc. The amines so obtained having in some instances two different radicals uniting various nitrogen atoms also can be treated with alkylene oxides as previously noted. In essence, any one of a number of suitable polyamines are acceptable provided the structure contains a primary amino group and a secondary amino group separated by at least two and not more than three carbon atoms provided that side chains or some other functional group does not interfere with ring formation.

In the hereto appended claims reference to polyalkylene amines includes all such amines which are functionally capable of forming cyclic amidines as, for example, polyamides in which one or two terminal groups have been replaced by a hydroxyalkyl radical or by an alkyl radical or the like. Obviously in the case of a diamide only one terminal group can be so converted. In the case of amines having 3 or more nitrogen atoms, both terminal groups could be converted. This applies regardless of whether the products form 5-membered rings or 6-membered rings.

PART 3

The acid which may be employed can be a high molal monocarboxy detergent-forming acid, such as a saturated or unsaturated aliphatic acid having at least 8 or not over 32 carbon atoms, a naphthenic acid, a rosin acid, an acid obtained from the oxidation of wax, or the like. Suitable acids are caprylic, capric, stearic, oleic, ricinoleic, lauric, palmitic, hydroxystearic, abietic, hydroabietic, fatty acids derived from animal or vegetable sources, for example, cocoanut oil, rapeseed oil, palm oil, olive oil, cottonseed oil, fish oils, etc. Such acids combine with soluble bases, such as caustic soda or caustic potash, to give soap or detergent-like materials.

Although many of the examples herein described are derivatives of high molal acids for the reason that such radical adds oil solubility as well as other desirable characteristics, it is to be emphasized in the broadest aspect the present invention includes the use of low molal acids such as acetic acid, glycolic acids, lactic acid, butyric acid, phthalic anhydride, benzoic acid, diglycolic acid and the like. Products obtained from such low molal acids are of definite interest as such and also as admixtures of similar derivatives derived from high molal acids.

PART 4

The dicarboxy acids which may be employed in the manufacture of the cyclic amidines may be high molal or low molal. An example of the high molal acids are dimerized fatty acids. A complete description appears in aforementioned U.S. Patent No. 2,632,695. Purely by way of illustration reference is made to two formulas which depict common dimerized acids, as follows:

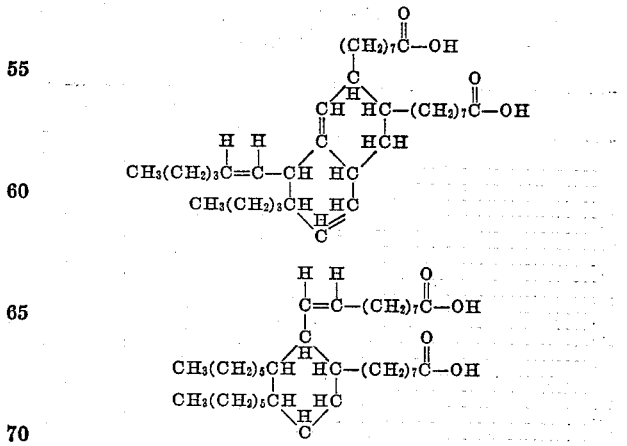

The acids produced commercially run approximately 85% or better dimer content with some trimer and some monomer. As pointed out in said aforementioned U.S. Patent No. 2,632,695 a well known source of these dimeric acids is the product sold by Emery Industries, Inc., and said to be dilinoleic acid. In the literature published by the Emery Industries, Inc., the properties of this product are given as follows:

| | |
|---|---|
| Neutral equivalent | 290–310. |
| Iodine value | 80–95. |
| Color | Gardner 12 (max.). |
| Dimer content | Approx. 85%. |
| Trimer and higher | Approx. 12%. |
| Monomer | Approx. 3%. |

Low molal dicarboxy acids include diglycolic acid, adipic acid, sebacic acid, isosebacic acid, phthalic acid, maleic acid, malonic acid, azelaic acid, ethylene bis glycolic acid, and nadic anhydride, etc.

PART 5

Typical amino imidazolines are shown in the following table:

Table I

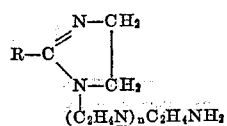

(C$_2$H$_4$N)$_n$C$_2$H$_4$NH$_2$
H

| Ex. No. | R | n |
|---|---|---|
| 1a | CH$_3$ | 2 |
| 2a | C$_2$H$_5$ | 0 |
| 3a | C$_3$H$_7$ | 1 |
| 4a | C$_6$H$_{13}$ | 2 |
| 5a | C$_8$H$_{17}$ | 0 |
| 6a | C$_{13}$H$_{27}$ | 1 |
| 7a | C$_{15}$H$_{31}$ | 2 |
| 8a | C$_{17}$H$_{35}$ | 0 |
| 9a | C$_{19}$H$_{39}$ | 1 |
| 10a | C$_{21}$H$_{43}$ | 2 |
| 11a | C$_{13}$H$_{25}$ | 0 |
| 12a | C$_{15}$H$_{29}$ | 1 |
| 13a | C$_{17}$H$_{33}$ | 2 |
| 14a | C$_{19}$H$_{37}$ | 0 |
| 15a | C$_{21}$H$_{41}$ | 1 |
| 16a | C$_{17}$H$_{33}$O | 2 |
| 17a | C$_{17}$H$_{31}$ | 0 |
| 18a | C$_{17}$H$_{29}$ | 1 |
| 19a | C$_{17}$H$_{27}$ | 2 |
| 20a | C$_{19}$H$_{31}$ | 0 |
| 21a | C$_{21}$H$_{35}$ | 1 |
| 22a | C$_{17}$H$_{35}$ | 2 |
| 23a | C$_{17}$H$_{33}$ | 0 |
| 24a | C$_{17}$H$_{31}$ | 1 |
| 25a | C$_{17}$H$_{29}$ | 2 |

Typical amino imidazolines are shown on Table II.

Table II

R—C(=N—CH$_2$)(N—CH$_2$)
(C$_2$H$_4$N)$_n$C$_2$H$_4$N—CR'
H                H   O

| Ex. No. | R | R' | n |
|---|---|---|---|
| 1b | CH$_3$ | CH$_3$ | 2 |
| 2b | C$_2$H$_5$ | C$_2$H$_5$ | 0 |
| 3b | C$_3$H$_7$ | C$_3$H$_7$ | 1 |
| 4b | C$_6$H$_{13}$ | CH$_3$ | 2 |
| 5b | C$_8$H$_{17}$ | C$_8$H$_{17}$ | 0 |
| 6b | C$_{13}$H$_{27}$ | C$_{13}$H$_{27}$ | 1 |
| 7b | C$_{15}$H$_{31}$ | C$_{15}$H$_{31}$ | 2 |
| 8b | C$_{17}$H$_{35}$ | C$_{17}$H$_{35}$ | 0 |
| 9b | C$_{19}$H$_{39}$ | C$_{17}$H$_{35}$ | 1 |
| 10b | C$_{21}$H$_{43}$ | C$_{21}$H$_{43}$ | 2 |
| 11b | C$_{13}$H$_{25}$ | C$_{13}$H$_{25}$ | 0 |
| 12b | C$_{15}$H$_{29}$ | C$_{15}$H$_{29}$ | 1 |
| 13b | C$_{17}$H$_{33}$ | C$_{17}$H$_{33}$ | 2 |
| 14b | C$_{19}$H$_{37}$ | C$_{19}$H$_{37}$ | 0 |
| 15b | C$_{21}$H$_{41}$ | C$_{21}$H$_{41}$ | 1 |
| 16b | C$_{17}$H$_{33}$O | C$_{17}$H$_{33}$O | 2 |
| 17b | C$_{17}$H$_{31}$ | C$_{17}$H$_{31}$ | 0 |
| 18b | C$_{17}$H$_{29}$ | C$_{17}$H$_{29}$ | 1 |
| 19b | C$_{17}$H$_{27}$ | C$_{17}$H$_{27}$ | 2 |
| 20b | C$_{19}$H$_{31}$ | C$_{19}$H$_{31}$ | 0 |
| 21b | C$_{21}$H$_{35}$ | C$_{21}$H$_{35}$ | 1 |
| 22b | C$_{17}$H$_{35}$ | C$_8$H$_{17}$ | 2 |
| 23b | C$_{17}$H$_{33}$ | C$_{17}$H$_{33}$ | 0 |
| 24b | C$_{17}$H$_{31}$ | C$_{17}$H$_{31}$ | 1 |
| 25b | C$_{17}$H$_{29}$ | C$_{17}$H$_{29}$ | 2 |

Examples of amino imidazolines and amido imidazolines in which there is a hydroxyl alkyl radical subject to sulfation is illustrated by Table III following:

Table III

| Ex. No. | n | R | R' | R'' |
|---|---|---|---|---|
| 1c | 0 | C$_{13}$H$_{27}$ | | C$_2$H$_4$OH |
| 2c | 1 | C$_{17}$H$_{35}$ | | C$_3$H$_6$OH |
| 3c | 2 | C$_{19}$H$_{39}$ | | C$_4$H$_8$OH |
| 4c | 0 | C$_{13}$H$_{25}$ | | C$_2$H$_4$OH |
| 5c | 1 | C$_{17}$H$_{33}$ | | (C$_2$H$_4$O)$_2$H |
| 6c | 2 | C$_{17}$H$_{33}$O | | (C$_2$H$_4$O)$_3$H |
| 7c | 0 | C$_{21}$H$_{41}$ | | C$_3$H$_6$OH |
| 8c | 1 | C$_{13}$H$_{27}$ | | (C$_3$H$_6$O)$_2$H |
| 9c | 2 | C$_{17}$H$_{35}$ | | (C$_3$H$_6$O)$_3$H |
| 10c | 0 | C$_{19}$H$_{39}$ | | C$_2$H$_4$OH |
| 11c | 1 | CH$_3$ | | C$_3$H$_6$OH |
| 12c | 2 | C$_2$H$_5$ | | C$_4$H$_8$OH |
| 13c | 0 | C$_3$H$_7$ | | (C$_3$H$_6$O)$_2$H |
| 14c | 1 | C$_2$H$_5$O | | (C$_4$H$_8$O)$_2$H |
| 15c | 2 | C$_4$H$_9$ | | (C$_4$H$_8$O)$_2$H |
| 16c | 0 | C$_{13}$H$_{27}$ | C$_{13}$H$_{27}$ | C$_2$H$_4$OH |
| 17c | 1 | C$_{17}$H$_{35}$ | C$_{17}$H$_{35}$ | C$_3$H$_6$OH |
| 18c | 2 | C$_{19}$H$_{39}$ | C$_{19}$H$_{39}$ | C$_4$H$_8$OH |
| 19c | 0 | C$_{13}$H$_{25}$ | C$_{13}$H$_{25}$ | C$_2$H$_4$OH |
| 20c | 1 | C$_{17}$H$_{33}$ | C$_{17}$H$_{33}$ | (C$_2$H$_4$O)$_2$H |
| 21c | 2 | C$_{17}$H$_{33}$O | C$_{17}$H$_{33}$O | (C$_2$H$_4$O)$_3$H |
| 22c | 0 | C$_{21}$H$_{41}$ | C$_{21}$H$_{41}$ | C$_3$H$_6$OH |
| 23c | 1 | C$_{13}$H$_{27}$ | C$_{13}$H$_{27}$ | (C$_3$H$_6$O)$_2$H |
| 24c | 2 | C$_{17}$H$_{35}$ | C$_{17}$H$_{35}$ | C$_4$H$_8$OH |
| 25c | 0 | C$_{19}$H$_{39}$ | C$_{19}$H$_{39}$ | C$_2$H$_4$OH |
| 26c | 1 | CH$_3$ | CH$_3$ | C$_3$H$_6$OH |
| 27c | 2 | C$_2$H$_5$ | C$_2$H$_5$ | C$_4$H$_8$OH |
| 28c | 0 | C$_3$H$_7$ | C$_3$H$_7$ | (C$_3$H$_6$O)$_2$H |
| 29c | 1 | C$_2$H$_5$ | C$_2$H$_5$O | (C$_3$H$_6$O)$_3$H |
| 30c | 2 | C$_4$H$_9$ | C$_4$H$_9$ | (C$_4$H$_8$O)$_2$H |

Imidazolines having two rings and obtained from dicarboxy acids are illustrated on Table IV immediately following.

Table IV (1d) H$_2$C—N—C—CH$_2$COCH$_2$C—N—CH$_2$ / H$_2$C—N     N—CH$_2$
       C$_2$H$_4$NH$_2$     C$_2$H$_4$NH$_2$ (2d) CH$_2$—N—C—C(CH$_2$)$_2$C—N—CH$_2$ / CH$_2$—N     N—CH$_2$
       H$_2$NC$_2$H$_4$NC$_2$H$_4$     C$_2$H$_4$NC$_2$H$_4$NH$_2$
              H (3d) CH$_2$—N—C—C(CH$_2$)$_4$C—N—CH$_2$ / CH$_2$—N     N—CH$_2$
       C$_2$H$_4$NH$_2$     C$_2$H$_4$NC$_2$H$_4$NH$_2$
                                H (4d) H$_2$C—N—C—C(CH$_2$)$_4$C—N—CH$_2$ / H$_2$C—N     N—CH$_2$
                  O
       HOOC(CH$_2$)$_4$CNC$_2$H$_4$     C$_2$H$_4$NC(CH$_2$)$_4$COOH
                 H (5d) H$_2$C—N—C—C(CH$_2$)$_8$C—N—CH$_2$ / H$_2$C—N     N—CH$_2$
       H$_2$NH$_4$C$_2$NH$_4$C$_2$NC$_2$H$_4$     C$_2$H$_4$N$_2$H$_4$NC$_2$H$_4$NH$_2$
              H        H                           H      H (6d) 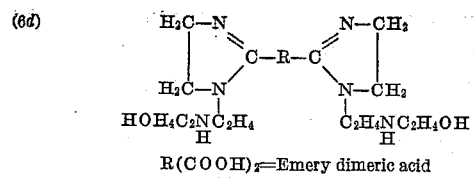
R(COOH)₂=Emery dimeric acid (7d) 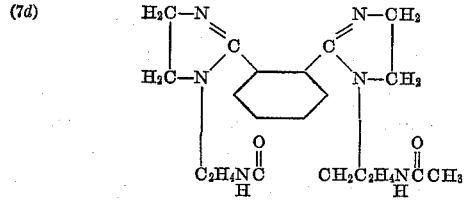

(8d) 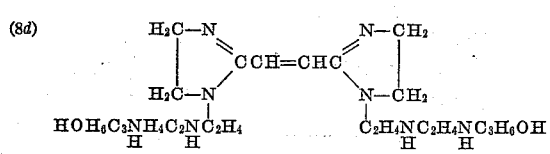

(9d) 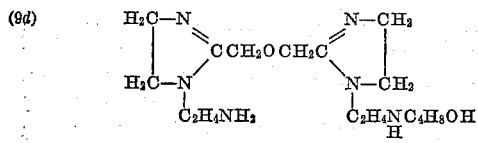

(10d) 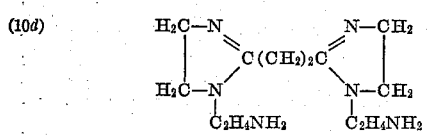

(11d) 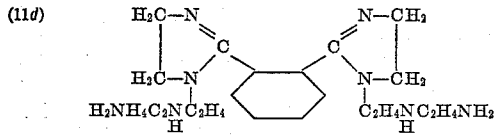

(12d) 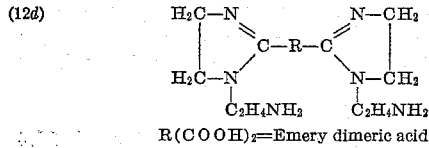
R(COOH)₂=Emery dimeric acid (13d) 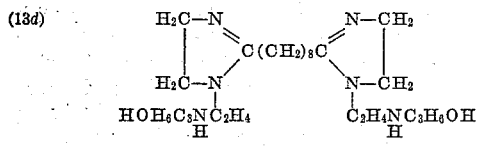

(14d) 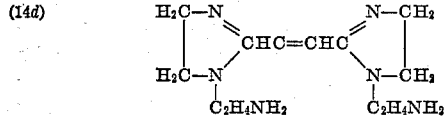

(15d) 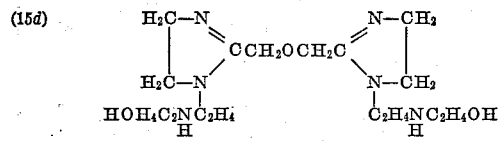

(16d) 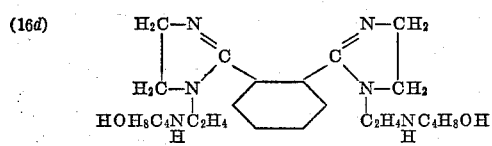

(17d) 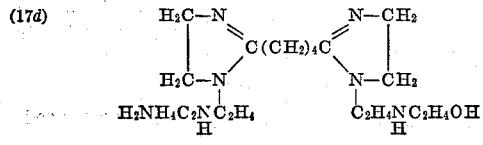

(18d) 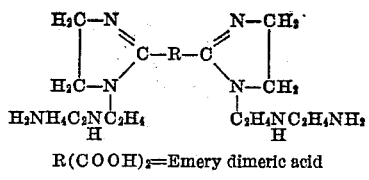
R(COOH)₂=Emery dimeric acid (19d) 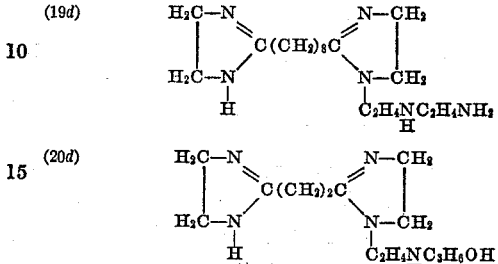

(20d) 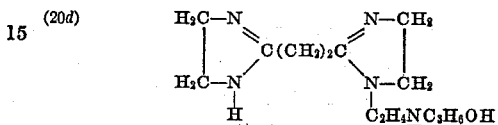

Imidazolines derived from a single amine, i.e., tetramine and pentamine and two mols of a monocarboxy acid are illustrated in Table V immediately following:

Table V

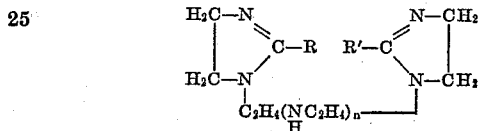

|  | n | R | R' |
|---|---|---|---|
| (1e) | 0 | CH₂ | CH₃ |
| (2e) | 1 | C₄H₉ | C₄H₉ |
| (3e) | 2 | C₈H₁₇ | C₈H₁₇ |
| (4e) | 0 | C₁₃H₂₇ | C₁₃H₂₇ |
| (5e) | 1 | C₁₇H₃₃ | C₁₇H₃₃ |
| (6e) | 2 | C₁₇H₃₃ | C₁₇H₃₃O |
| (7e) | 0 | CH₃ | C₄H₉ |
| (8e) | 1 | C₈H₁₇ | C₁₃H₂₇ |
| (9e) | 0 | C₁₃H₂₇ | C₁₇H₃₃O |
| (10e) | 1 | C₁₃H₂₇ | C₁₇H₃₃ |

All the various compounds described previously and obtained from amines in which the nitrogen atoms are separated by two carbon atoms can also be obtained from comparable amines of a trimethylene type, i.e., where the nitrogen atoms are separated by three carbon atoms. Such tetrahydropyrimidines are more expensive than the corresponding imidazolines. For this reason more imidazolines have been illustrated and it is then preferable to use the cheaper imidazolines. Such cyclic amine and cyclic imidine derivatives are illustrated in Table VI following:

Table VI (1f) 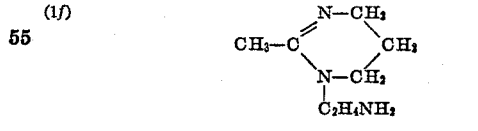

(2f) 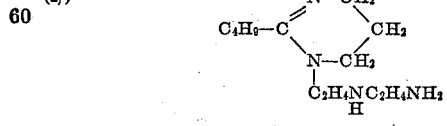

(3f) 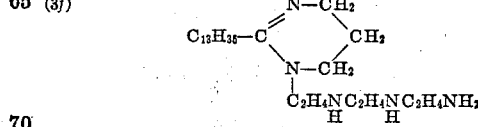

(4f) 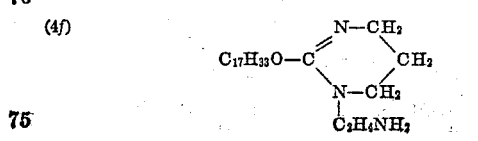

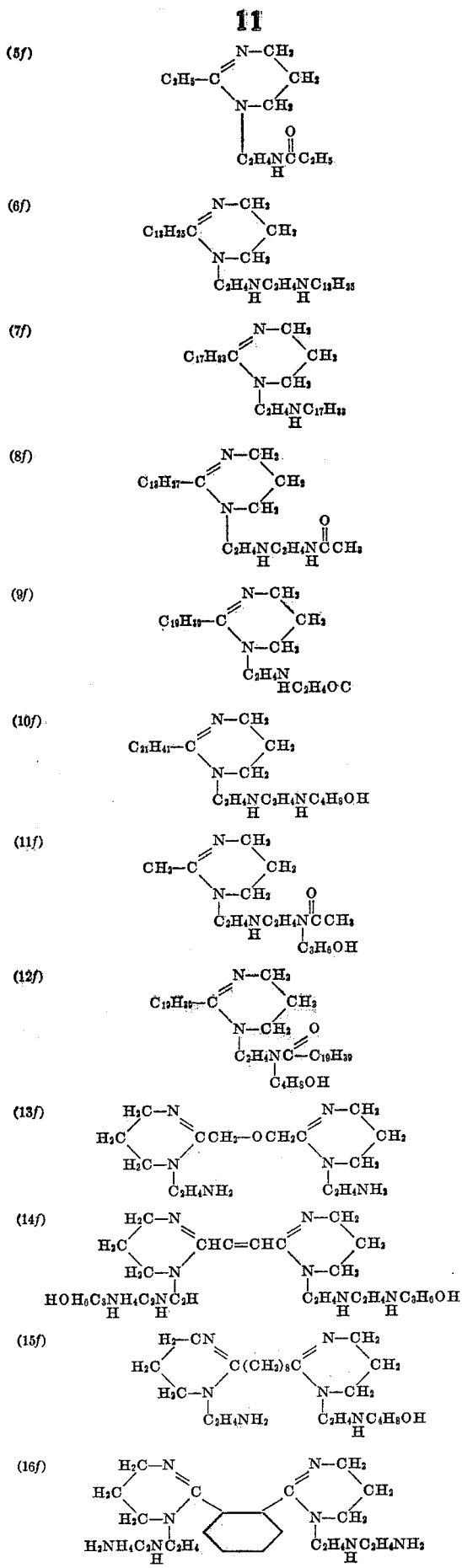
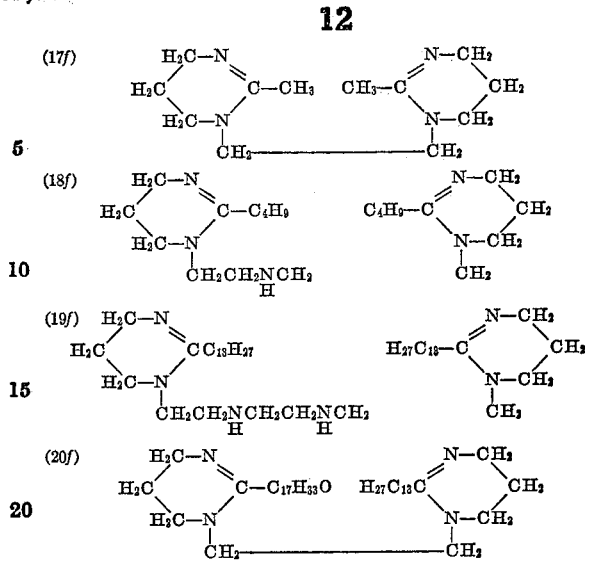

PART 6

The present invention is concerned with sulfonated cyclic amidines. No differentiation is intended in regard to whether there is introduced a sulfated group or a sulfonic group or sulfur in some other organically combined form as has been previously stated. Without attempting to differentiate between sulfation and sulfonation and using the term "sulfonating" to include both types of reactions, it is to be noted that one can obtain suitable compounds by use of sulphur trioxide or sulfuric anhydride. Salt formation is, of course, excluded for the reason that the sulphate radical or equivalent is not organically combined. The cyclic amidine may be reacted so as to introduce more than one sulfo group. Where one sulfo group is introduced there is a possibility, depending on the composition of the cyclic amidines, that some sort of inner salt formation takes place by reaction between the residual basic cyclic amidine radical or a different salt formed by combination with another cyclic amidine molecule. For practical purposes what has been said will be illustrated by the examples immediately following.

Example 1g

Into a stainless steel sulfonator was charged 25.4 pounds of the product from Example 1a together with 41.4 pounds of ordinary mineral spirits. The sulfonator was equipped with an agitator and gas inlet tube plus heating and cooling coils and the usual inlet and outlet valves. The gas tube was arranged so as to discharge beneath the agitator, which consisted of a simple 8-bladed turbine. The mixture was warmed to 50° C. whereupon 16 pounds of anhydrous sulfur trioxide was run in over 2-hour period. The $SO_3$ was used as a gas diluted with nine volumes of dry air. The temperature was maintained between 50 and 60° C. The product was a yellowish liquid. On evaporation of the solvent, the product was a viscous, tacky syrup. The yield was above 90% based on the $SO_3$ admitted.

Example 2g

The sulfonator was charged with 34.8 pounds of the product referred to in Example 23a, and 41.8 pounds of mineral spirits. Sulfur trioxide and air in a 1:9 ratio was passed in over a 45 minute period. Although 8 pounds of $SO_3$ were to be used, only 7 pounds were run in due to the viscosity of the resulting sulfonate. The starting temperature was 55° C. and the temperature was allowed to range as high as 75° C., in an effort to reduce viscosity. The solvent-containing product was an orange, immobile liquid at room temperature. The solvent free sulfonate was soluble in xylene and dispersible in water.

Example 3g

The product described in Example 22b was used.

23.1 pounds of it plus 28.1 pounds of xylene was employed. Xylene was used instead of mineral spirits because it exhibits a greater solvency and also tends to produce lesser viscosities. When gaseous sulfur trioxide is employed as the sulfonating agent, the xylene does not appear to be sulfonated due to the much greater $SO_3$ affinity of the cyclic amidine. 9 pounds of gaseous $SO_3$ at a 12:1 air ratio was run in over a one-hour period. The product was light colored, of medium viscosity, and contained a small amount of a second phase. The second phase, a solid, was probably due in part to the stearic acid content of the amidine, which acid tends to give amidines that are poorly soluble in organic solvents.

*Example 4g*

25.9 pounds of the product shown in Example 13c was mixed with 37.9 pounds of mineral spirits and charged as a part suspension into the sulfonator. 12 pounds of sulfur trioxide at a 7:1 air ratio was passed in over a two-hour period at a temperature of 70° C. A stronger air:$SO_3$ concentration was used since more than 1 molal equivalent of $SO_3$ was introduced. Also, this ratio is more favorable for reaction between $SO_3$ and alcoholic OH radicals. The product was separated from the solvent as a water dispersible, viscous liquid. It was also dispersible in aromatic solvents, and soluble in alcohols.

*Example 5g*

In this example 24.2 pounds of product from Example 8c were mixed with 28.2 pounds of xylene. The batch was warmed to 75° C. and sulfur trioxide passed in at a 9:1 ratio. 4 pounds of $SO_3$ were used in one-half hour. The product was extremely viscous when cooled, and dark brown in color. On removal of the xylene, it was a hard solid.

PART 7

As previously noted in the products obtained in Part 6 and particularly where one sulfo group is introduced into a cyclic amidine having plurality of basic nitrogen atoms it is possible to add a high molal acid or a low molal acid so as to form a salt with the residual basicity of a sulfonated cyclic amidine and thus change or alter its solubility in either oil or water so as to make the product more satisfactory for certain purposes. The sulfonated cyclic amidine properly selected can be reacted with low molal acids such as acetic acid, lactic acid, glycolic acid, propionic acid, diglycolic acid and the like. On the other hand one can use naphthenic acid, higher fatty acids, tall oil, sulfonic acids, and particularly oil soluble petroleum sulfonic acids such as mahogany acids to form salts. Examples 1H to 5H on Table VII immediately following show appropriate combinations between sulfonated cyclic amidines of the series 1g to 10g previously described and various acids to form suitable salts.

*Table VII*

| Ex. No. | Description |
| --- | --- |
| 1H | Of the product described as Example 1g, 82.8 grams were partially neutralized with 28 grams of oleic acid. The neutralization was conducted by mixing the two reactants together and then simply warming them to about 50° C. while stirring. The original product, prepared from acetic acid and tetraethylene-pentamine, which tended to be hydrophile in some respects was thus converted to a product which was not water dispersible at all. Furthermore, the solubility in such solvents as gasoline and kerosene was improved by addition of the hydrophobe oleic acid. |
| 2H | To 28.1 grams of the product called Example 3g were added 2 grams of propionic acid. The reactants were held at 60° C. for 2 hours with constant agitation. The addition of this relatively minor amount of low molal acid caused a change in the properties of the sulfonated cyclic amidine such that it became a one phase product instead of a two phase product as previously described in Example 3g. |
| 3H | 24.2 grams of product from Example 5g were mixed with 1.5 grams of acetic acid and warmed together. Addition of the acetic acid caused the sulfonated cyclic amidine to become water dispersible to a fair degree, while its solubility in xylene seemed to be unaffected. |

PART 8

The sulfonated cyclic amidines herein described can be used for a variety of purposes. For instance, they may be used as chemical intermediates, including reaction with alkylene oxides or alkylene imines.

The products as such or their derivatives can be used in fungicidal preparations, bactericides, orchard sprays, and the like.

They are also useful in contributing anti-static properties to cationic wax emulsions and solutions. They are useful as anti-stripping additives in connection with asphalt. They may be employed to improve the water resistance of printing inks. They are useful for the purposes of forming dispersions, increasing wetting power, and demulsifying emulsions.

They are particularly useful as fuel oil additives as is disclosed in co-pending application Serial No. 526,328, filed August 3, 1955, of Verner L. Stromberg and Alvin H. Smith, now U.S. Patent 2,917,376.

I claim:

1. A member of the group consisting of sulfur trioxide treated imidazolines and acid addition salts thereof obtained by contacting an imidazoline selected from the class consisting of

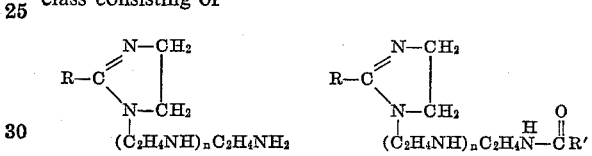

and

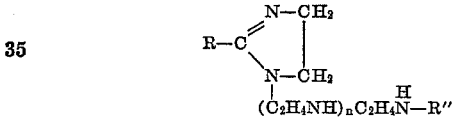

wherein R and R' are each selected from the class consisting of alkyl and alkenyl groups containing 1 to 21 carbon atoms, where $n$ is 0 to 2, and where R'' is selected from the class consisting of hydroxyalkyl and hydroxyalkyleneoxy groups containing 2 to 9 carbon atoms, while dissolved in a hydrocarbon solvent, with sulfur trioxide diluted with air under sulfonation conditions including a temperature of 50–75° C. and an air to sulfur trioxide ratio by volume of 7 to 12:1.

2. A sulfur trioxide treated imidazoline of claim 1 wherein the imidazoline reactant is

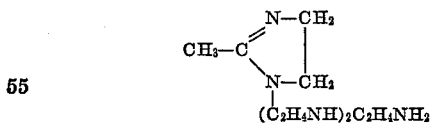

3. A sulfur trioxide treated imidazoline of claim 1 wherein the imidazoline reactant is

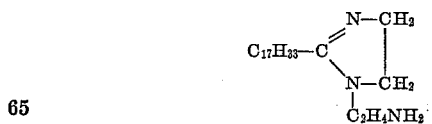

4. A sulfur trioxide treated imidazoline of claim 1 wherein the imidazoline reactant is

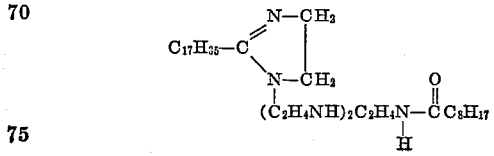

5. A sulfur trioxide treated imidazoline of claim 1 wherein the imidazoline reactant is
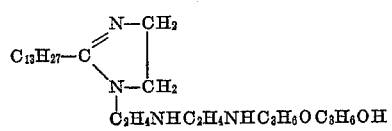
6. A sulfur trioxide treated imidazoline of claim 1 wherein the imidazoline reactant is
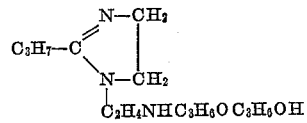
No references cited.